(12) United States Patent
Kurokawa

(10) Patent No.: US 10,186,347 B2
(45) Date of Patent: Jan. 22, 2019

(54) FLEXIBLE FLAT CABLE AND IMAGE FORMING APPARATUS

(71) Applicant: KYOCERA Document Solutions Inc., Osaka-shi, Osaka (JP)

(72) Inventor: Yuichiro Kurokawa, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/738,129

(22) PCT Filed: Jun. 8, 2016

(86) PCT No.: PCT/JP2016/067092
§ 371 (c)(1),
(2) Date: Dec. 20, 2017

(87) PCT Pub. No.: WO2017/002562
PCT Pub. Date: Jan. 5, 2017

(65) Prior Publication Data
US 2018/0182510 A1  Jun. 28, 2018

(30) Foreign Application Priority Data
Jun. 29, 2015 (JP) .................... 2015-130306

(51) Int. Cl.
*H01B 7/08* (2006.01)
*H01R 12/77* (2011.01)
(Continued)

(52) U.S. Cl.
CPC ........... *H01B 7/0823* (2013.01); *G03G 15/80* (2013.01); *G03G 21/1652* (2013.01); *H01B 7/02* (2013.01);
(Continued)

(58) Field of Classification Search
CPC ....................................................... H01B 7/08
(Continued)

(56) References Cited

U.S. PATENT DOCUMENTS 5,147,510 A * 9/1992 Iura ................. H01R 12/592
174/117 A
5,384,432 A * 1/1995 Noro ................... G11B 5/4853
174/117 F (Continued)

FOREIGN PATENT DOCUMENTS

JP  2001196130 A  7/2001
JP  2001266658 A  9/2001
(Continued)

OTHER PUBLICATIONS

Office Action issued in the counterpart Japanese Patent Application No. 2017-526254 dated Jun. 5, 2018, 2 pages.

*Primary Examiner* — Chau N Nguyen
(74) *Attorney, Agent, or Firm* — Viering, Jentschura & Partner mbB

(57) ABSTRACT

The flexible flat cable includes a plurality of conductive wires, an insulating covering member, and a reinforcing plate. The thin conductive wires are arranged in parallel with one another in a direction perpendicular to the thickness direction thereof. The insulating covering member covers faces of the conductive wires, on at least one side of the conductive wires in the thickness direction. The reinforcing plate covers and reinforces the end parts of faces of the conductive wires in the thickness direction. The faces on the other side of the conductive wires in the thickness direction include exposed faces adjacent to the end parts. The exposed faces are not covered with the reinforcing plate and covering member.

2 Claims, 7 Drawing Sheets

(51) Int. Cl.
- *H04N 1/04* (2006.01)
- *H04N 1/10* (2006.01)
- *H04N 1/107* (2006.01)
- *G03G 15/00* (2006.01)
- *G03G 21/16* (2006.01)
- *H01B 7/02* (2006.01)
- *H01B 7/04* (2006.01)
- *H01B 7/24* (2006.01)
- *H01R 12/79* (2011.01)
- *H01R 13/24* (2006.01)

(52) U.S. Cl.
CPC ................ *H01B 7/04* (2013.01); *H01B 7/24* (2013.01); *H01R 12/77* (2013.01); *H01R 12/79* (2013.01); *H04N 1/04* (2013.01); *H04N 1/10* (2013.01); *H04N 1/107* (2013.01); *H01R 13/24* (2013.01); *H04N 2201/0094* (2013.01)

(58) Field of Classification Search
USPC .................................................. 174/117 FF
See application file for complete search history.

(56) References Cited

U.S. PATENT DOCUMENTS

| | | | |
|---|---|---|---|
| 7,399,928 B2* | 7/2008 | Sakamoto | H01B 7/0838 174/117 F |
| 7,402,756 B2* | 7/2008 | Hoshino | H05K 1/118 174/254 |
| 2003/0000730 A1 | 1/2003 | Kwok et al. | |
| 2014/0332267 A1 | 11/2014 | Tanaka et al. | |

FOREIGN PATENT DOCUMENTS

| | | |
|---|---|---|
| JP | 2002319318 A | 10/2002 |
| JP | 2014220171 A | 11/2014 |

\* cited by examiner

FLEXIBLE FLAT CABLE AND IMAGE FORMING APPARATUS

RELATED APPLICATIONS

The present application is a national stage entry according to 35 U.S.C. § 371 of PCT application No.: PCT/JP2016/067092 filed on Jun. 8, 2016, which claims priority from Japanese application No.: 2015-130306 filed on Jun. 29, 2015 and is incorporated herein by reference in its entirety.

TECHNICAL FIELD

The present invention relates to a flexible flat cable and an image forming apparatus.

BACKGROUND ART

Image forming apparatuses, typified by multifunction peripherals, read an image of an original document by using an image reading unit, and then emit light to a photoreceptor in an image forming unit based on the read image to form an electrostatic latent image on the photoreceptor. Then, the image forming apparatuses apply a charged developer, such as toner, onto the formed electrostatic latent image on the photoreceptor to make it into a visible image that is in turn transferred onto a sheet of paper and fixed by a fuser, and eject the sheet outside the image forming apparatuses.

Some image forming apparatuses include a flexible flat cable (FFC) in, for example, the image reading unit. Technologies relating to the FFC are disclosed in Japanese Unexamined Patent Application Publication Nos. 2001-196130 (PTL 1) and 2001-266658 (PTL 2).

CITATION LIST

Patent Literature

PTL 1: Japanese Unexamined Patent Application Publication No. 2001-196130

PTL 2: Japanese Unexamined Patent Application Publication No. 2001-266658

SUMMARY OF INVENTION

Technical Problem

In order to prevent an FFC attached to a connector from slipping off the connector, for example, a lock mechanism can be possibly employed as disclosed in PTL1. However, such a lock mechanism increases the complexity of the structure, which is not preferable in terms of cost. On the other hand, the technique disclosed in PTL2 cannot provide adequate stiffness to exposed parts of conductive wires of an FFC. After the FFC is inserted and extracted a plurality of times, the exposed conductive wire parts may curl up, which is a problem associated with durability.

An object of the present invention is to provide a flexible flat cable that can ensure electrical connection in a more proper manner and has improved durability.

Another object of the invention is to provide an image forming apparatus with improved durability.

Solution to Problem

In one aspect of the present invention, a flexible flat cable includes a plurality of conductive wires, an insulating covering member, and a reinforcing plate. The conductive wires are each in the shape of a thin sheet, and are arranged in parallel with one another in a direction perpendicular to the thickness direction of the conductive wires. The insulating covering member covers faces of the conductive wires, the faces being located on at least one side of the conductive wires in the thickness direction. The reinforcing plate covers end parts of faces of the conductive wires, the faces being located on at least the other side of the conductive wires in the thickness direction, to reinforce the end parts. The faces on the other side of the conductive wires in the thickness direction include exposed faces adjacent to the end parts. The exposed faces are not covered with the reinforcing plate and covering member.

In another aspect of the present invention, an image forming apparatus includes a connector having connecting terminals, and a flexible flat cable detachable from the connector and having conductive wires that when attached, make contact with the connecting terminals to ensure electrical continuity. The flexible flat cable includes a plurality of the conductive wires, an insulating covering member, and a reinforcing plate. The insulating covering member covers faces of the conductive wires, the faces being located on at least one side of the conductive wires in the thickness direction. The reinforcing plate covers end parts of faces of the conductive wires, the faces being located on at least the other side of the conductive wires in the thickness direction to reinforce the end parts. The faces on the other side of the conductive wires in the thickness direction include exposed faces adjacent to the end parts. The exposed faces are not covered with the reinforcing plate and covering member.

Advantageous Effect of Invention

According to the flexible flat cable, the reinforcing plate covering to reinforce the faces on the other side of the conductive wires in the thickness direction can increase the stiffness and improve the strength. Therefore, the flexible flat cable can maintain its stiffness even after inserted and extracted a plurality of times, and therefore can establish contact between the exposed parts of the conductive wires and the connecting terminals of the connector in a more proper manner. In addition, the faces on the other side of the conductive wires in the thickness direction include the exposed faces that are adjacent to the end parts and are not covered with the reinforcing plate and covering member. Even if the flexible flat cable is attached, for example, at an angle to the connector, the properly sized exposed faces can prevent shorting between the conductive wires. Between the exposed faces of the conductive wires and a face located on an outer side of the reinforcing plate, there is a difference in level. When the connecting terminals of the connector are brought into contact with the exposed faces, the connecting terminals are hooked on the reinforcing plate, thereby reducing the possibility that the flexible flat cable may slip off the connector. Thus the flexible flat cable can ensure electrical connection in a more proper manner and has improved durability.

In addition, the image forming apparatus has improved durability.

DESCRIPTION OF EMBODIMENT

Figure 1:
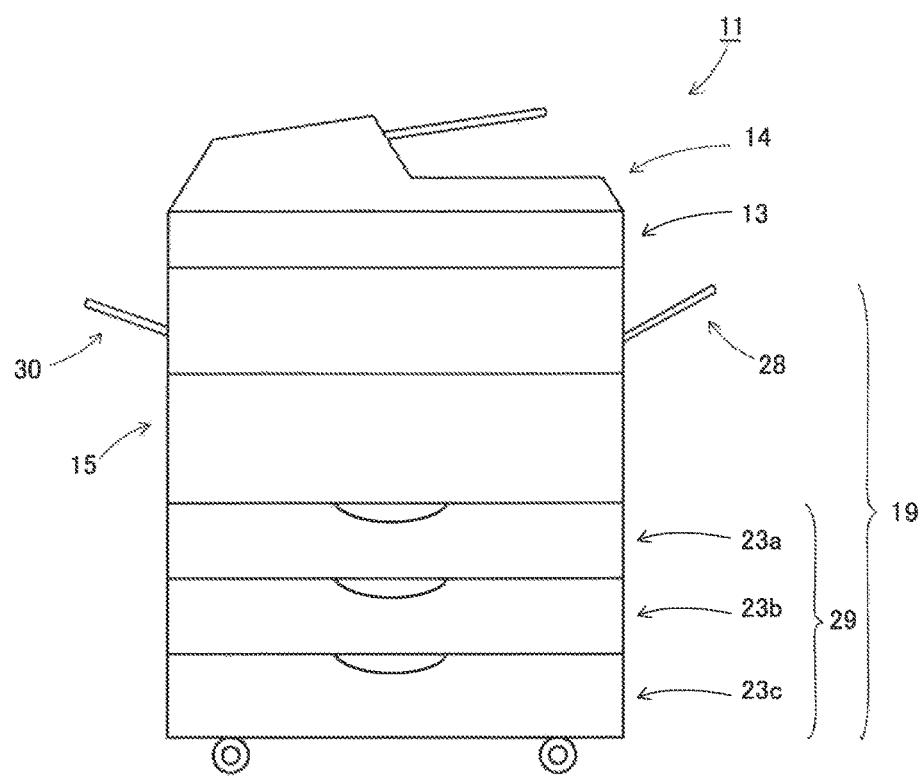
FIG. 1 is a schematic external view of a multifunction peripheral to which an image forming apparatus including a flexible flat cable according to an embodiment of the present invention is applied.
Figure 2:
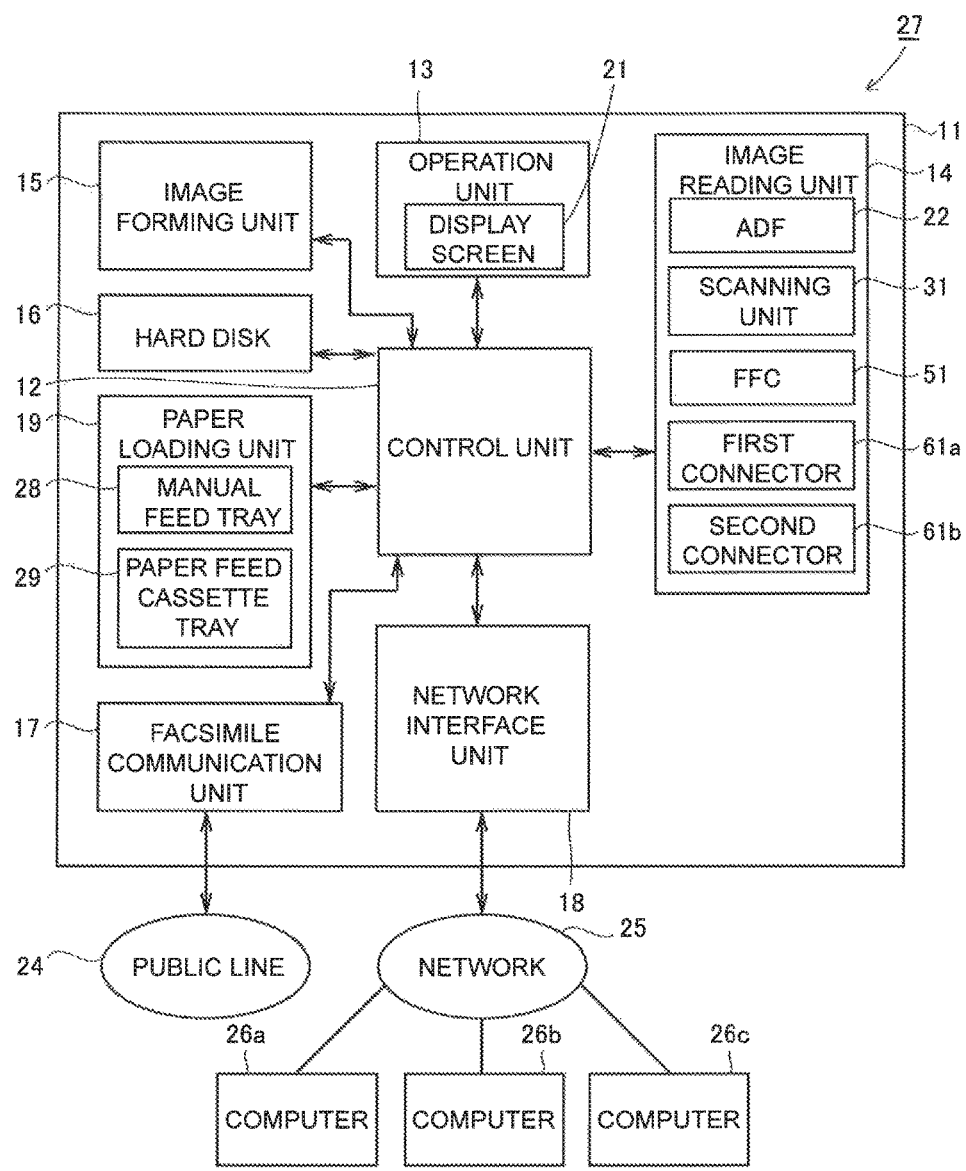
FIG. 2 is a block diagram showing the configuration of the multifunction peripheral shown in FIG. 1.

Embodiments of the present invention will be described below. FIG. 1 is a schematic external view of a multifunction peripheral to which an image forming apparatus including a flexible flat cable (hereinafter, sometimes abbreviated as FFC) according to an embodiment of the present invention is applied. FIG. 2 is a block diagram showing the configuration of the multifunction peripheral shown in FIG. 1.

Referring to FIGS. 1 and 2, the multifunction peripheral 11 includes a control unit 12, an operation unit 13, an image reading unit 14 having an FFC 51 and connectors 61a, 61b, an image forming unit 15, a paper loading unit 19, an ejection tray 30, a hard disk 16 serving as a storage unit, a facsimile communication unit 17, and a network interface unit 18 used to connect with a network 25.

The control unit 12 controls the entire multifunction peripheral 11. The operation unit 13 includes a display screen 21 that displays information submitted from the multifunction peripheral 11 and entries made by users. The operation unit 13 allows the users to input image forming conditions, such as the number of copies and gradation degrees, and to turn on or off the power source. The image reading unit 14 includes an auto document feeder (ADF) 22 serving as a document transporting device that transports an original document placed on a loading position to a reading position. The image reading unit 14 reads an image of the original document loaded in the ADF 22 or placed on a document table, which is not shown in the drawings. The paper loading unit 19 includes a manual feed tray 28 on which paper is manually loaded, and a paper feed cassette set 29 that can accommodate multiple sheets of paper of different sizes. The paper loading unit 19 accommodates sheets of paper to be supplied to the image forming unit 15. The image forming unit 15 forms an image on paper transported from the paper loading unit 19, based on an image read by the image reading unit 14 or image data transmitted via the network 25. The paper with the image formed by the image forming unit 15 is ejected onto the ejection tray 30. The hard disk 16 stores the transmitted image data, the input image forming conditions, and so on.

The facsimile communication unit 17 is connected to a public line 24 and performs facsimile transmission and reception.

The multifunction peripheral 11 also includes a dynamic random access memory (DRAM) where image data is written in or is read out from, and other components, but their pictorial representations and descriptions are omitted. Arrows in FIG. 2 indicate control signal flows and data flows relating to control operations and images. As shown in FIG. 1, the paper feed cassette set 29 in this embodiment includes three paper feed cassettes 23a, 23b, 23c.

The multifunction peripheral 11 operates as a copier by enabling the image forming unit 15 to form an image based on image data of an original document read by the image reading unit 14. In addition, the multifunction peripheral 11 operates as a printer by enabling the image forming unit 15 to form an image and print it on paper based on image data transmitted through the network interface unit 18 from computers 26a, 26b, 26c connected to the network 25. In other words, the image forming unit 15 operates as a printing unit for printing required images. The multifunction peripheral 11 operates as a facsimile by receiving image data transmitted from the public line 24 through the facsimile communication unit 17 and enabling the image forming unit 15 to form an image using the image data via DRAM, or by transmitting image data of an original document, read by the image reading unit 14, through the facsimile communication unit 17 to the public line 24. The multifunction peripheral 11 has a plurality of functions relating to image processing, such as a copying function, a printer function, and a facsimile function. The multifunction peripheral 11 also has a function of minutely setting each of the functions.

The multifunction peripheral 11 according to the embodiment of this invention and the computers 26a, 26b, 26c connected to the multifunction peripheral 11 via the network 25 establish an image forming system 27.

Figure 3:
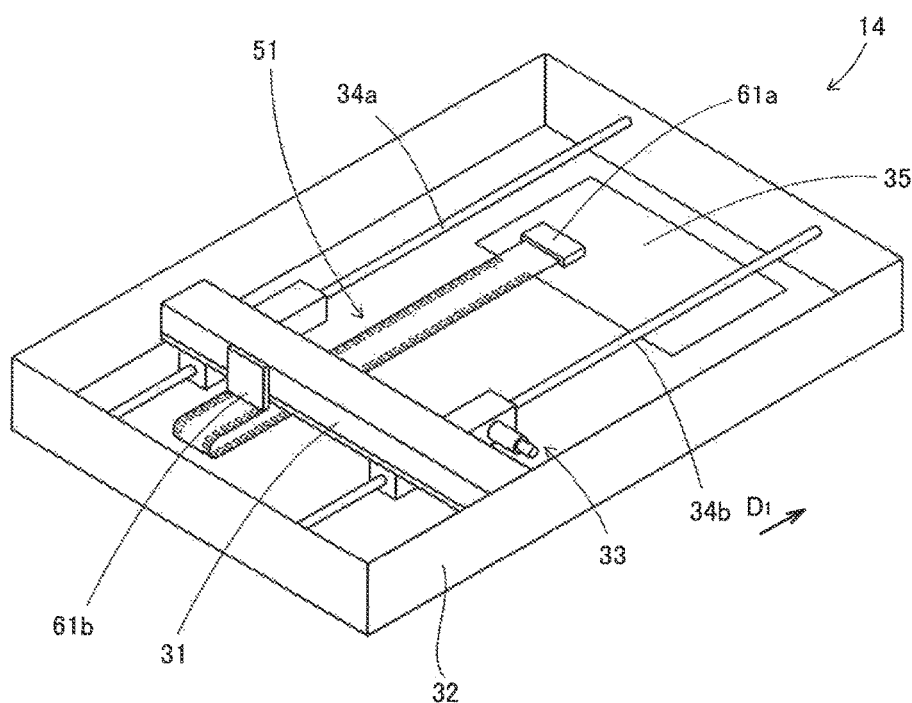
FIG. 3 is a schematic view showing the configuration of an image reading unit included in the multifunction peripheral shown in FIG. 1.

Next, the configuration of the image reading unit 14 in the multifunction peripheral 11 will be described partially. FIG. 3 is a perspective view partially showing the configuration of the image reading unit 14.

Referring to FIG. 3, the image reading unit 14 includes a scanning unit 31 that reads an image of an original document placed on a document table (not shown). The scanning unit 31 includes, for example, an exposure unit that is composed of a plurality of light emitting diodes (LEDs) arranged in a main scanning direction and emitting light toward the document table, a plurality of mirrors, a lens that condenses the light, a charge coupled device (CCD) sensor that functions as an image sensor, and some other components (any of these aforementioned components are not shown in the drawing). The scanning unit 31 is disposed in a case 32 provided to the image reading unit 14.

The scanning unit 31 is made movable in a sub-scanning direction indicated by an arrow D1 in FIG. 3 or the opposite direction by a moving mechanism 33 including a motor, a pulley, and a pair of sliders. When the scanning unit 31 moves, a pair of guide shafts 34a, 34b, which are spaced apart in parallel with each other in the case 32 and extends in the sub-scanning direction, guide the scanning unit 31.

At a bottom part of the case 32 provided is a control circuit 35 to which the image data of the original document read by the scanning unit 31 is input. The scanning unit 31 is electrically connected to the control circuit 35 with the FFC 51. Specifically, one end of the FFC 51 is attached to the first connector 61a provided to the control circuit 35 for connection. The other end of the FFC 51 is attached to the second connector 61b provided to the scanning unit 31 for connection. The FFC 51 is detachable from the first and second connectors 61a, 61b.

Figure 4:
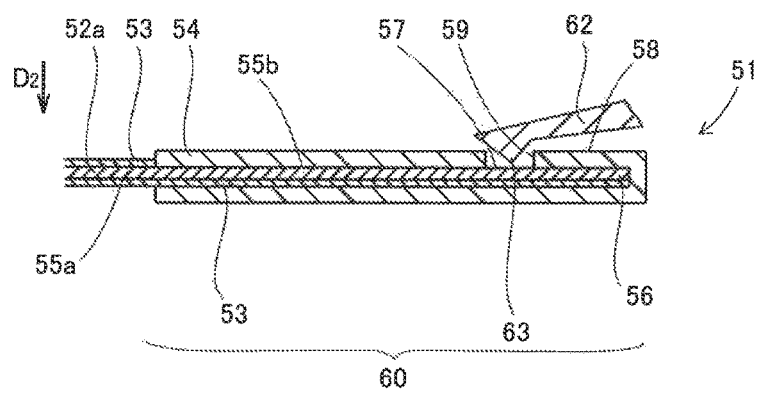
FIG. 4 is a schematic cross-sectional view showing a part of the flexible flat cable provided in the multifunction peripheral.
Figure 5:
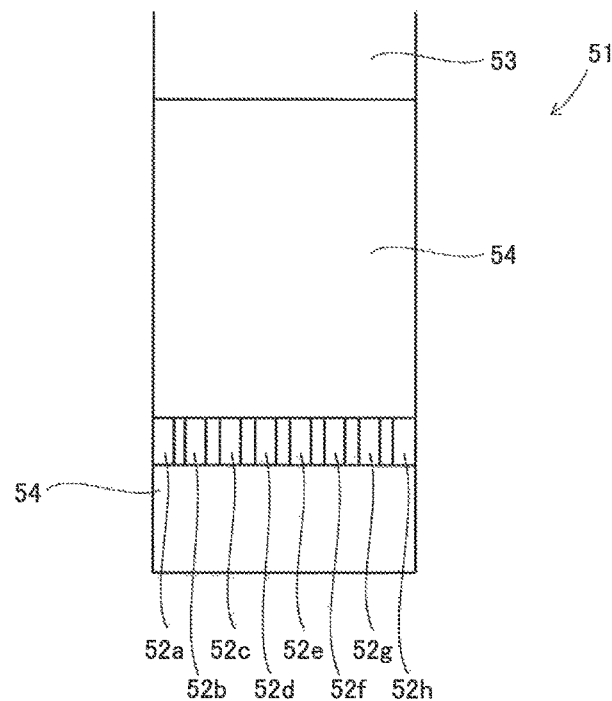
FIG. 5 partially illustrates the external appearance of the flexible flat cable.

Next, the configuration of the FFC 51 provided to the image reading unit 14 will be described. FIG. 4 is a schematic cross-sectional view partially showing the FFC 51 in the image reading unit 14. FIG. 5 partially illustrates the external appearance of the FFC 51.

Referring to FIGS. 4 and 5, the FFC 51 includes a plurality of sheet-like conductive wires, in this example, eight conductive wires 52a, 52b, 52c, 52d, 52e, 52f, 52g, 52h. The direction indicated by an arrow D2 shown in FIG. 4 or the opposite direction denotes the thickness direction of the conductive wires 52a to 52h. The eight conductive wires 52a to 52h are spaced apart in parallel with one another in a direction perpendicular to the thickness direction.

The FFC 51 includes an insulating covering member 53 that entirely covers faces 55a of the conductive wires 52a to 52h. The faces 55a are located on one side of the conductive wires 52a to 52h in the thickness direction. The covering member 53 ensures insulation of the side where the faces 55a of the conductive wires 52a to 52h are present.

The FFC 51 also includes a reinforcing plate 54 that reinforces faces 55b, which are located on the other side of the conductive wires 52a to 52h in the thickness direction, by covering the faces 55b so that a part of each of the faces 55b is exposed, but an end part 53 of each of the conductive wires 52a to 52h is not exposed. In the present embodiment, the reinforcing plate 54 is provided to both sides of the conductive wires 52a to 52h in the thickness direction. Specifically, the reinforcing plate 54 covers the conductive wires 52a to 52h so as to extend from the faces 55b on the other side of the conductive wires 52a to 52h and fold back around the end parts 56 to the faces 55a on the one side of the conductive wires 52a to 52h, except for outwardly exposed faces 57 of the conductive wires 52a to 52h. In short, the faces 55b on the other side of the conductive wires 52a to 52h in the thickness direction have the exposed faces 57 adjacent to the end parts 56, and the exposed faces 57 are not covered with the reinforcing plate 54 and covering member 53. The conductive wires 52a to 52h have areas where the reinforcing plate 54 is not provided on both sides in the thickness direction. The areas are covered with the insulating covering member 53. Consequently, as to the covered part of the conductive wires 52a to 52h, an end area 60 of the FFC 51 is thicker on the one side of the conductive wires 52a to 52h in the thickness direction than the other just by the thickness of the covering member 53. The reinforcing plate 54 is also made of an insulating material.

When the FFC 51 is attached to the connector 61a, connecting terminals 62 somewhat bend toward the FFC 51, and contact parts 63 of the connecting terminals 62 abut against the exposed faces 57. In this contact manner, the electrical continuity between the conductive wire 52a and connecting terminal 62 is ensured.

There is a difference in level between the exposed faces 57 of the conductive wires 52a to 52h and a face 58 located on an outer side of the reinforcing plate 54. The reinforcing plate 54 has a face 59, which is positioned close to the end parts 56 and is connected to the exposed faces 57. The face 59 extends in a direction perpendicular to the exposed faces 57. The face 59 is a flat face.

According to the FFC 51 configured as above, the reinforcing plate 54 that covers and reinforces the faces 55b on the other side of the conductive wires 52a to 52h in the thickness direction can provide the FFC 51 with high stiffness and improved strength. Even if the FFC 51 is inserted and extracted a plurality of times, the FFC 51 can maintain its stiffness to allow the connecting terminals 62 of the connector 61a to properly contact with the exposed faces 57 of the conductive wires 52a to 52h. The faces 55b, which are located on the other side of the conductive wires 52a to 52h in the thickness direction, have the exposed faces 57 that are adjacent to the end parts 56 and are not covered with the reinforcing plate 54 and covering member 53. The properly sized exposed faces 57 can prevent shorting between the conductive wires 52a to 52h, for example, even when the FFC 51 is attached at an angle to the connector 61a. In addition, the level difference between the exposed faces 57 of the conductive wires 52a to 52h and the face 58 located on the outer side of the reinforcing plate 54 allows the connecting terminals 62 of the connector 61a to hook the reinforcing plate 54, thereby reducing the risk of the FFC 51 slipping off the connector 61a. Consequently, the FFC 51 as described above can ensure electrical connection in a more proper manner and has improved durability.

The reinforcing plate 54 provided on both sides of the conductive wires 52a to 52h in the thickness direction can further increase the stiffness.

Figure 6:
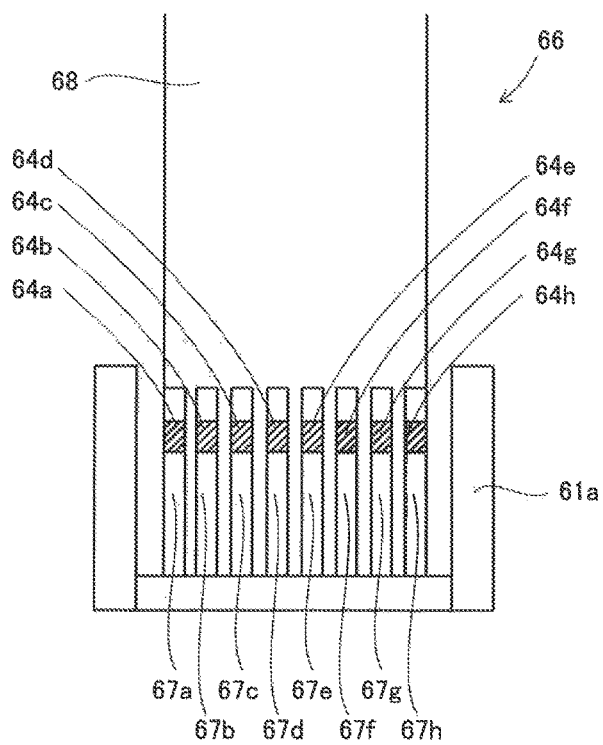
FIG. 6 illustrates a flexible flat cable without a reinforcing plate, the flexible flat cable being straightly attached to the proper attachment position of the connector.
Figure 7:
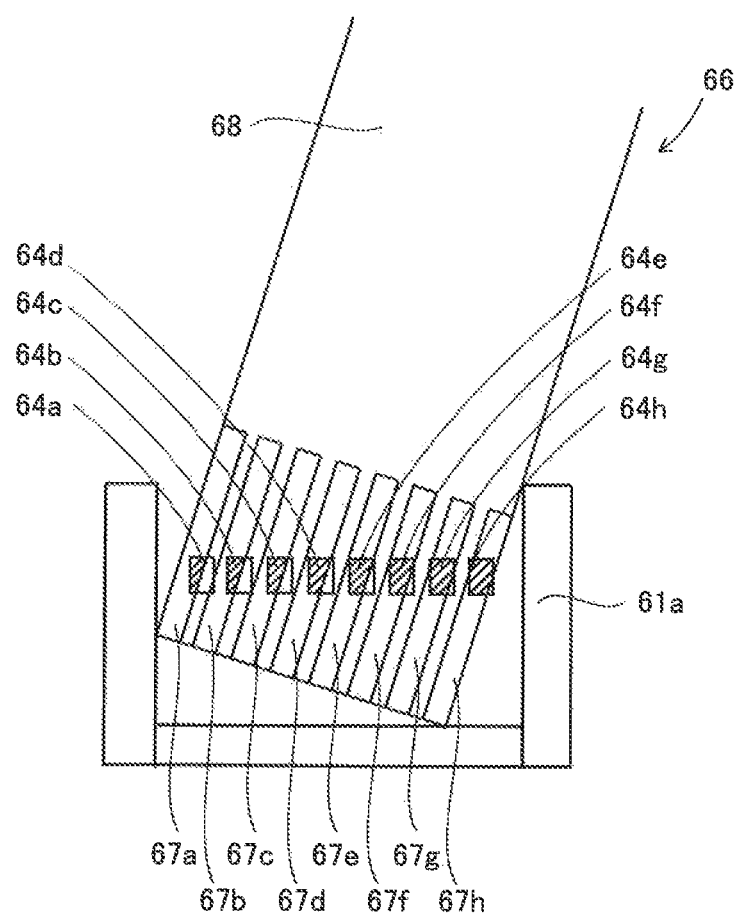
FIG. 7 illustrates the flexible flat cable without the reinforcing plate, the flexible flat cable being attached at an angle to the proper attachment position of the connector.

The reasons why the FFC 51 can prevent shorting between the conductive wires 52a to 52h will be described. FIGS. 6 and 7 illustrate an FFC 66, which is not equipped with a reinforcing plate, seated in the connector 61a. FIG. 6 shows the FFC 66 that is properly, or straightly, attached to an attachment position of the connector 61a. FIG. 7 shows the FFC 66 that is attached at an angle to the attachment position of the connector 61a.

Referring to FIG. 6, the conductive wires 67a, 67b, 67c, 67d, 67e, 67f, 67g, 67h are bare except for parts covered with a covering member 68. If the FFC 66 is straightly attached to the connector 61a as shown in FIG. 6, the conductive wires 67a to 67h properly contact with the connecting terminals 64a, 64b, 64c, 64d, 64e, 64f, 64g, 64h, respectively. In FIGS. 6 to 9, the areas where the connecting terminals 64a to 64h contact with the conductive wires 67a to 67h are hatched.

On the other hand, if the FFC 66 is attached at an angle to the connector 61a as shown in FIG. 7, the conductive wires 67a to 67h do not properly contact with the connecting terminals 64a to 64h, respectively. In addition, the connecting terminals may contact two of the neighboring conductive wires, for example, as the connecting terminal 64a contacts with both the conductive wires 67a and 67b. This causes shorting, and therefore increases the risk of damage of the FFC 66.

Figure 8:
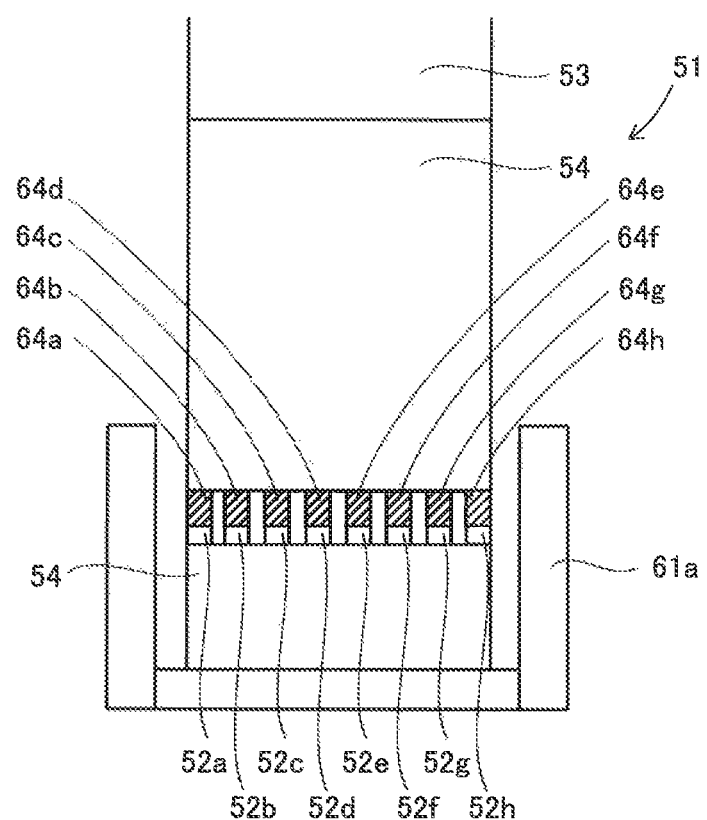
FIG. 8 illustrates the flexible flat cable shown in FIGS. 4 and 5, the flexible flat cable being straightly attached to the proper attachment position of the connector.
Figure 9:
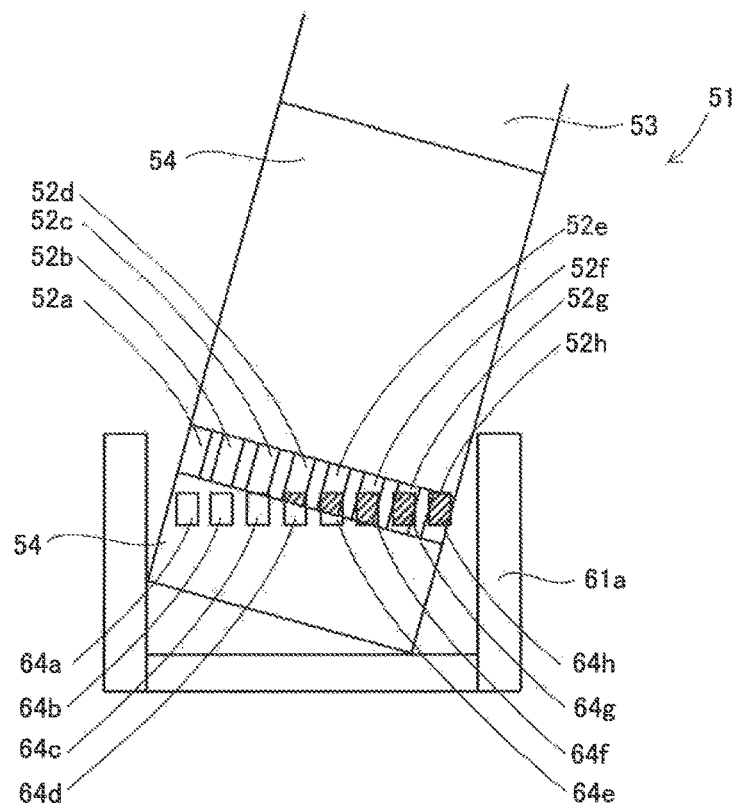
FIG. 9 illustrates the flexible flat cable shown in FIGS. 4 and 5, the flexible flat cable being attached at an angle to the proper attachment position of the connector.

FIGS. 8 and 9 show the FFC 51, shown in FIGS. 4 and 5, seated in the connector 61a. FIG. 8 corresponds to FIG. 6, while FIG. 9 corresponds to FIG. 7.

Referring to FIG. 8, if the FFC 51 is straightly attached to the connector 61a, the conductive wires 52a to 52h properly contact with the connecting terminals 64a to 64h, respectively.

If the FFC 51 is attached at an angle to the connector 61a, the conductive wires 52a to 52h do not properly contact with the connecting terminals 64a to 64h, respectively. However, since the exposed faces of the conductive wires 52a to 52h are relatively small, any of the connecting terminals 64a to 64h do not contact with two of the neighboring conductive wires 52a to 52h, and therefore shorting does not occur between the conductive wires 52a to 52h. Thus, the risk of damage of the FFC 51 is reduced.

Thus, the FFC 51 as configured above can ensure electrical connection in a more proper manner and has improved durability.

Furthermore, the multifunction peripheral 11 including the FFC 51 as configured above can improve the durability.

In the above-described embodiment, the reinforcing plate 54 is provided so as to cover the outer sides of the covering member 53; however, the present invention is not limited thereto, and the reinforcing plate 54 can be configured not to cover the outer sides of the covering member 53. In other words, there is no problem if the reinforcing plate 54 is configured to cover at least the end parts 56 of the faces 55b on the other side of the conductive wires 52a to 52h in the thickness direction.

In the above-described embodiment, the face 59, which is a part of the reinforcing plate 54 and is connected to the exposed faces 57 close to the end parts 56, is configured to be flat; however, the present invention is not limited thereto, and the face 59, which is a part of the reinforcing plate 54 and is connected to the exposed faces 57 close to the end parts 56, can be configured to be curved, such as an arc-shaped surface.

In the above-described embodiment, the face 59, which is a part of the reinforcing plate 54 and is connected to the exposed faces 57 close to the end parts 56, is configured to extend from the exposed faces 57 in a direction perpendicular to the exposed faces 57; however, the present invention is not limited thereto, and the angle between the face 59, which is a part of the reinforcing plate 54 and is connected to the exposed faces 57 close to the end parts 56, and the exposed faces 57 can be an obtuse angle.

Figure 10:
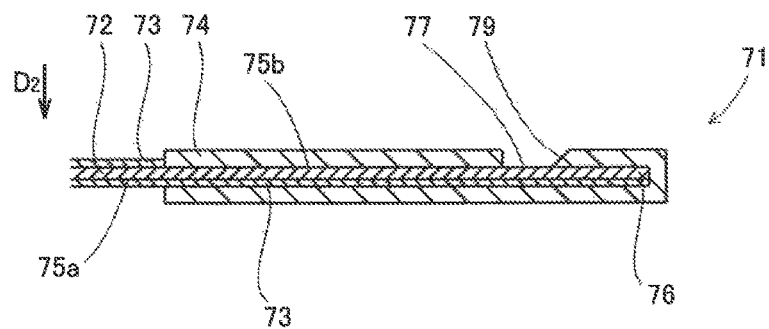
FIG. 10 is a cross-sectional view showing a part of a flexible flat cable according to another embodiment of the invention.

FIG. 10 is a cross-sectional view showing a part of a FFC 71 in the above case. FIG. 10 corresponds to FIG. 4.

Referring to FIG. 10, the FFC 71 according to another embodiment of the present invention includes a plurality of conductive wires 72, an insulating covering member 73, and a reinforcing plate 74. The conductive wires 72 are each in the shape of a thin sheet, and are arranged in parallel with one another in a direction perpendicular to the thickness direction thereof. The covering member 73 covers faces 75a of the conductive wires 72, the faces 75a being located on one side of the conductive wires 72 in the thickness direction. The reinforcing plate 74 covers end parts 76 of faces 75b of the conductive wires 72, the faces 75b being located on the other side of the conductive wires 72 in the thickness direction to reinforce the end parts 76. The faces 75b on the other side of the conductive wires 72 in the thickness direction include exposed faces 77 adjacent to the end parts 76. The exposed faces 77 are not covered with the reinforcing plate 74 and covering member 73. In this configuration, the angle between a face 79, which is a part of the reinforcing plate 74 and is connected to the exposed faces 77 close to the end parts 76, and the exposed faces 77 is an obtuse angle. Having the obtuse angle between the face 79 and exposed faces 77 can reduce the possibility of curling up the reinforcing plate 74 when the FFC 71 is inserted into or extracted from the connector 61a.

Alternatively, the angle between the face 79, which is a part of the reinforcing plate 74 and is connected to the exposed faces 77 close to the end parts 76, and the exposed faces 77 may be an acute angle. Having the acute angle between the face 79 and exposed faces 77 can reliably prevent the FFC 71 from slipping off the connector 61a.

Although the FFCs 51 and 71 in the above-described embodiments are provided in the multifunction peripheral 11, the present disclosure is not limited thereto, and the FFCs 51 and 71 can be provided in other types of electronic devices.

It should be understood that the embodiments and examples disclosed herein are illustrative and non-restrictive in every respect. The scope of the present invention is defined by the terms of the claims, rather than by the foregoing description, and is intended to include any modifications within the scope and meaning equivalent to the terms of the claims.

INDUSTRIAL APPLICABILITY

The FFC and image forming apparatus according to the present invention can be effectively used especially to meet a demand for improving the durability.

What is claimed is:

1. A flexible flat cable comprising:
   a plurality of conductive wires arranged in parallel with one another in a direction perpendicular to a thickness direction thereof, each of the conductive wires being in the shape of a thin sheet;
   a covering member having an insulating property and covering faces of the conductive wires, with the covering member being located on one side of the conductive wires in the thickness direction at an end part of the plurality of conductive wires; and
   a reinforcing plate covering an end surface of the conductive wires, and being located on both sides of the conductive wires in the thickness direction, and
   wherein
   an other side being located opposite the one side of the conductive wires in the thickness direction includes an exposed face that is adjacent to the end part and is not covered with the reinforcing plate and the covering member and
   a face of the reinforcing plate, which is close to the end surface and is abutting the exposed face, forms an obtuse angle with the exposed face.

2. An image forming apparatus including a connector having connecting terminals, and a flexible flat cable being detachable from the connector and having a plurality of conductive wires that when attached, make contact with the connecting terminals to ensure electrical continuity, wherein
   the flexible flat cable comprising:
   the plurality of conductive wires arranged in parallel with one another in a direction perpendicular to a thickness direction thereof, each of the conductive wires being in the shape of a thin sheet;
   a covering member having an insulating property and covering faces of the conductive wires, with the covering member being located on one side of the conductive wires in the thickness direction at an end part of the plurality of conductive wires; and
   a reinforcing plate covering an end surface of the conductive wires, and being located on both sides of the conductive wires in the thickness direction, and wherein
   an other side being located opposite the one side of the conductive wires in the thickness direction includes an exposed face that is adjacent to the end part and is not covered with the reinforcing plate and the covering member; and
   a face of the reinforcing plate, which is close to the end surface and is abutting the exposed face, forms an obtuse angle with the exposed face.

* * * * *